UNITED STATES PATENT OFFICE.

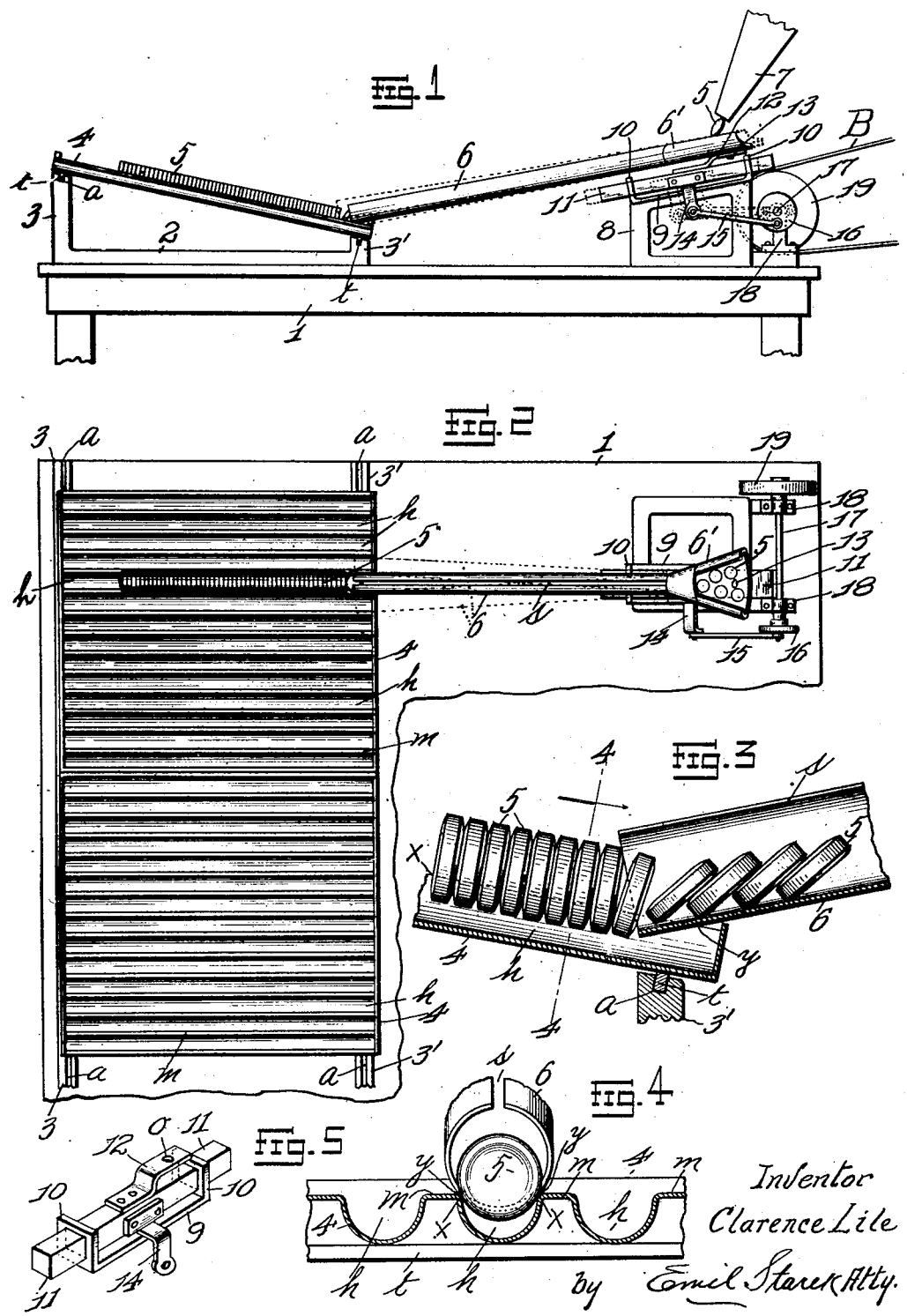

CLARENCE LILE, OF GRANITE CITY, ILLINOIS.

TABLET DISTRIBUTING AND COLLECTING MACHINE.

1,370,695.     Specification of Letters Patent.     Patented Mar. 8, 1921.

Application filed July 17, 1920. Serial No. 397,002.

*To all whom it may concern:*

Be it known that I, CLARENCE LILE, a citizen of the United States, residing at Granite City, in the county of Madison and State of Illinois, have invented certain new and useful Improvements in Tablet Distributing and Collecting Machines, of which the following is a full, clear, and exact description, reference being had to the accompanying drawings, forming a part hereof.

The present invention is directed to improvements in tablet distributing and collecting machines, the object sought being to provide a simple apparatus for distributing tablets, lozenges, and confections of various kinds, and collecting the same in the form of rows from which a predetermined number of tablets such as a dozen, may be removed and wrapped in convenient form for the trade as well understood in the art. A further object is to provide a machine which will distribute the tablets rapidly and without danger of clogging the distributing tube; one which is light and portable; one not necessarily restricted in its application to the disk or circular form of tablet; and one possessing further and other advantages better apparent from the following detailed description in connection with the accompanying drawings, in which—

Figure 1 represents a side elevation of the improved machine; Fig. 2 is a top plan thereof; Fig. 3 is an enlarged vertical section through the lower end of the collecting pan and through the discharge end of the distributing tube showing the manner of delivering and collecting the tablets; Fig. 4 is a cross-sectional detail on the line 4—4 of Fig. 3; and Fig. 5 is a detail perspective of the reciprocating block to which the distributing tube is attached.

Referring to the drawings, 1, represents a suitable bench or table on one side of which is supported an angle frame 2 provided with side vertical legs 3, 3', respectively, the outer leg 3 being the higher. The upper edges of the legs are grooved longitudinally, the grooves $a$ receiving the tongues $t$ formed along the bottoms of the collecting pans 4, of which there may be any number installed in practice. In the present embodiment of the invention the pans are moved or advanced by hand along the grooves or ways $a$ as the successive channels of the pans are filled with tablets. The pans are made preferably of sheet metal and are formed with a series of longitudinally disposed parallel channels or gutters $h$ spaced suitable distances apart by the ridges $m$, the channels being contoured transversely or cross-sectionally to cause the opposite edges of the channels to engage the edge of a tablet or confection 5 at the points $x$, $x$, (Fig. 4) or slightly below the horizontal diameter of the tablet. The tablets are delivered to the channels $h$ of the pan from the longitudinally slit distributing tube 6, the receiving end of the tube terminating in an open topped flat, conical or flaring charging hopper or head 6', the tablets being dropped directly into the head from a feed hopper 7 leading to any suitable source of tablet supply (not shown). The slit $s$ of the tube 6 is of course availed of to prevent clogging of the tablets in the tube as clearly obvious from the drawings.

The legs 3, 3', give the pans 4 a slope of substantially from fifteen to twenty degrees to the horizontal, and the tube 6 rests with its discharge end on the lower end of the pan at substantially the same angle (15 to 20 degrees), inclining however in the opposite direction (Fig. 1). To discharge the tablets from the tube onto the pan, the tube has imparted thereto a longitudinal reciprocation, any convenient mechanism for this purpose being available. In the present embodiment of the invention I mount on the table 1 opposite the member 2 a suitable stand or frame 8 having a sloping top conforming to the pitch of the distributing tube, said top having secured thereto a plate 9 terminating in upturned legs 10 provided with openings through which is free to reciprocate a block 11, the top of the block having secured thereto one end of a bent bracket 12, the free end of which is spaced from the block as shown (Figs. 1, 5). The raised end of the bracket is provided with a hole $o$ for the reception of a pin 13 about which the tube 6 is swiveled to swing horizontally. This swivel connection permits the lower or discharge end of the tube to be applied to the pan so as to discharge into a channel $h$ which is in direct alinement with the axis of the tube, or into a channel on either side of the alining channel, the slight deflection of the tube from a direct alining position with the channel in no wise impairing the action of the tube. Coupled to the side of the block 11 between the legs 10 is a bent bracket 14 to the lower end of which is pivotally coupled the adjacent end of a connecting rod 15 leading from the outer face of a crank disk 16 carried by the longitudinally disposed shaft 17, the latter being mounted in bearings 18, 18, as shown, or in any other suitable mechanical manner. The shaft 17 carries a pulley 19 from which leads a belt B to any suitable source of power (not shown).

The operation of the machine is substantially as follows: Tablets 5 being charged into the head 6' from the hopper 7, and a reciprocating (or shaking) motion being imparted to the tube 6 from the shaft 17 through the disk 16, connecting rod 15 and block 11, the tablets gravitate down the tube toward the discharge end thereof, the diameter of the tube being such as to allow the tablets to assume an inclined reclining position as shown in Fig. 3. The peripheral walls of the distributing tube engage, or are intersected by, the walls of the channel $h$ at substantially the points $y$, $y$, the lower edge of the tube between said points being spaced from the channel walls and raised a slight distance above the bottom portion of the periphery or edge of the tablet immediately discharged from the tube into the channel, the discharged tablet as above pointed out, engaging the edges of the channel $h$ at the points $x$, $x$, about which the tablet is free to rock. As clearly shown in Figs. 3 and 4, the lower portion of the discharge end of the tube (between the points $y$, $y$,) or that portion behind and above the lower edge of the discharged tablet pushes the tablet up the incline of the pan with each forward stroke, the series of tablets in the tube gravitating toward the discharge end thereof (as a result of the shaking or reciprocating movement of the tube) holding such discharged tablet against a return movement or a movement down the incline, a new tablet thereupon dropping out of the tube behind the tablet previously discharged; and as successive tablets are discharged they are crowded up the incline by the forward strokes of the tube, the row of tablets moving along the channel $h$ until the channel is full. Once a tablet drops out of the tube it can not reënter the same for the reason that it drops below the lower edge of the discharge end of the tube (Figs. 3, 4); and with successive reciprocations such tablet and all those that follow are pushed up the incline of the pan. The incline of the pan causes the tablets to rock about their axes (a line passing through the points $x$, $x$) clockwise (Fig. 3) or to a position substantially at right angles to the plane of inclination of the pan, so that as the tablets are pushed up the incline they remain in an erect position substantially as shown in Fig. 3. When one channel $h$ is filled with tablets, the operator pushes the pans along the grooves $a$ to bring the lower end of the tube 6 into the next channel (although as indicated in Fig. 2 the tube may be deflected so as to fill at least three channels without a positive advance of the pan) and so on through the series of channels until the pan is full. After this, the pan is removed by the operator to a suitable table or work bench where the tablets are picked out of the pans one dozen at a time and packed in suitable wrappers as well understood in the art. The proper degree of inclination to be given the pans 4 and tube 6 may be determined by trial. It is of course obvious that tablets having other forms than round may be distributed and collected as here described by conforming the contour of the collecting channel and the cross-section of the distributing tube to the shape of the tablet operated on. The details of the device may be changed in many particulars without in any wise departing from the nature or spirit of the invention.

Having described my invention what I claim is:

1. In a machine of the character described, a shaking tablet-distributing tube having a discharge opening, a collecting member provided with a channel for receiving the tablets discharged from the tube, the channel being contoured to engage the peripheral walls of the tube at two points between which the tube walls are spaced from the channel walls, the tablets dropped from the tube into the channel successively engaging the end of the tube, the latter operating to advance the tablets along the channel with the shaking movements thereof.

2. In a machine of the character described, a longitudinally reciprocating tablet-distributing tube having a terminal discharge, a collecting pan provided with a channel for receiving the tablets discharged from the tube, the channel being transversely contoured to engage the peripheral walls of the tube at two points between which the tube walls are spaced from the channel walls, and being contoured to allow the tablets to drop below the lower edge of the discharge end of the tube whereby the end of the tube wall between the engaging points aforesaid and adjacent the channel bears against the back of each tablet as the latter drops from the tube, causing the series of tablets to be advanced along the channel.

3. In a machine of the character described, a longitudinally reciprocating inclined tablet-distributing tube having a bottom terminal discharge, a collecting pan inclined in the opposite direction and provided with a channel disposed substantially parallel to the axis of the tube, the bottom peripheral walls of the lower end of the tube engaging the channel walls at points disposed on opposite sides of the axis of the tube but spaced from the channel between said points, the channel being contoured transversely to allow the tablets to drop below the bottom edge of the discharge end of the tube, whereby the rear face of each tablet dropping from the tube engages the end of the lower peripheral wall of the tube and the successive tablets are advanced along the channel.

4. In a machine of the character described, a reciprocating block, means for guiding the same, a bracket leading from the block and having a free end disposed parallel to the path of reciprocation thereof, a distributing tube terminating at one end in a charging head open at the top, and a swivel connection between said head and bracket.

5. In a machine of the character described, a reciprocating distributing tube for inclosing the articles, a collecting pan inclined thereto and provided with channels for receiving the discharges therefrom, the lower edge of the discharge end of the tube being spaced from the channel walls between which the articles dropped from the tube are received.

6. In a machine of the character described, a reciprocating inclined distributing tube for inclosing the articles, a collecting pan provided with channels coöperating therewith and inclined in the opposite direction to the tube and receiving the discharges therefrom, the lower edge of the discharge end of the tube being spaced from the channel walls between which the articles dropped from the tube are received.

In testimony whereof I affix my signature in presence of two witnesses.

CLARENCE LILE.

Witnesses:
   EMIL STAREK,
   ELSE M. SIEGEL.